June 24, 1930.  J. MULLER  1,767,391

DISCONNECTING COUPLING FOR PIPES AND THE LIKE

Filed Dec. 20, 1926  2 Sheets-Sheet 1

June 24, 1930. J. MULLER 1,767,391
DISCONNECTING COUPLING FOR PIPES AND THE LIKE
Filed Dec. 20, 1926 2 Sheets-Sheet 2

Patented June 24, 1930

1,767,391

UNITED STATES PATENT OFFICE

JACQUES MULLER, OF LA GARENNE COLOMBES, FRANCE

DISCONNECTING COUPLING FOR PIPES AND THE LIKE

Application filed December 20, 1926, Serial No. 156,033, and in France December 22, 1925.

This invention relates to a coupling for two pipes or the equivalent and is of the kind in which the outlet from the coupling is normally closed but is automatically opened when fitted to one of the pipes or other devices.

My improved coupling comprises an inner and an outer member, the inner member having an internal valve and exterior locking lugs or claws. The lugs or claws are adapted to be operated by a tapered or equivalent part of the outer member to lock the coupling to a tapered part of the member or nipple to which it is to be connected by relative longitudinal movement of the inner and the outer members and the construction of the coupling is such that the operation of coupling the parts opens the valve in the coupling.

Three forms of my invention are shown in the accompanying drawings.

Figure 1:
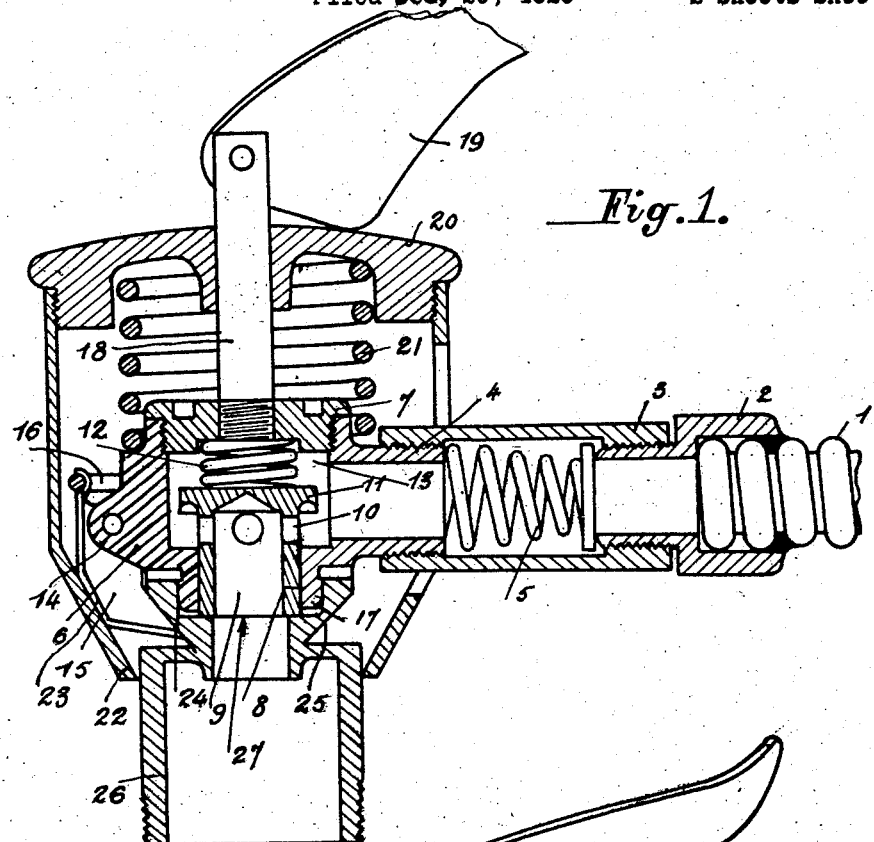
Figs. 1 and 2 are sectional views and show the same coupling in what I call open and shut positions respectively.
Figure 2:
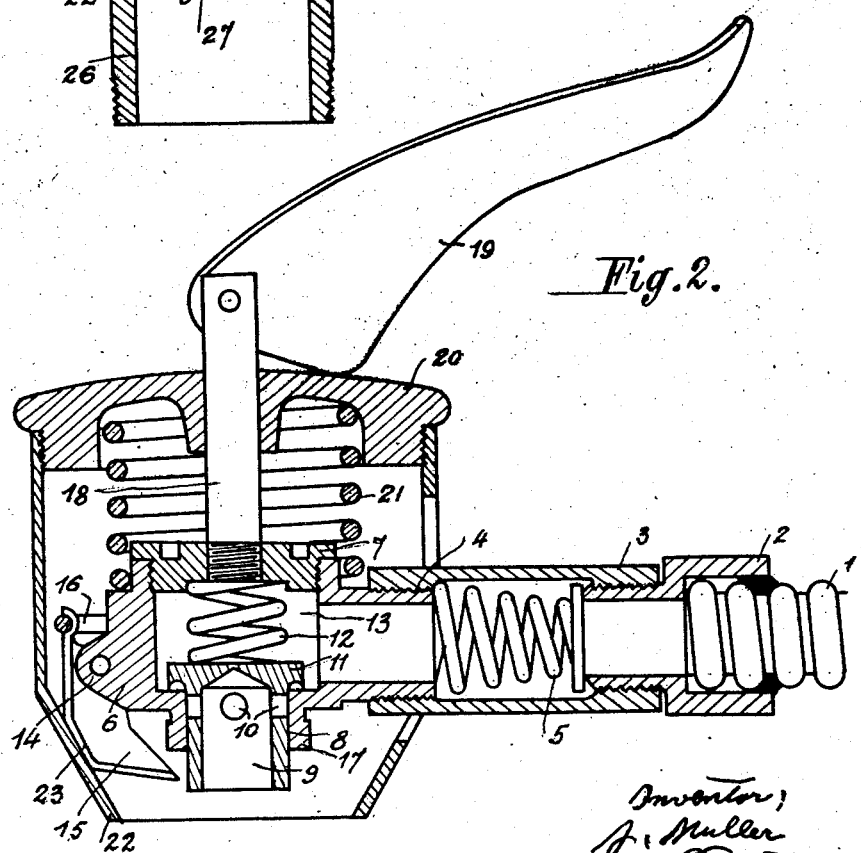

In the first form of construction the joint is shown mounted on a lubricating member (Fig. 1) and in the position of rest (Fig. 2).

In those figures, 1 is the pliant tube leading from the lubricating tank screwed by the nut 2 to an intermediate sleeve 3 and by this to the inlet orifice 4 of the coupling. A spring 5 is disposed between the members 2 and 4.

The coupling forming the subject of the invention mainly consists of a member 6 closed by a plug 7 and provided with two co-axial superposed cylindrical parts of different diameters. The smaller part 8 communicates with the outside and serves as the cylinder for a valve 9 provided with axial holes 10 and an upper collar 11 prevents it from passing down through the cylinder 8. This valve is constantly exposed to the action of an opposing spring 12 which tends to press it against its seat formed by the base of the larger part of chamber 13. The chamber 13 communicates with the inlet pipe 4 and with the interior of the piston 9. The member 6 is provided with lugs 14 about which pivot attaching claws 15 which a spring 16 tends always to separate from their attaching position. The member 6 ends in a lower collar 17 and carries an operating shaft 18 with a lever 19.

The main parts of the device are contained in a case 20 part of which is formed as a removable cup-like cover, said case having a slot-like opening in its side for the sleeve 3. The cap portion serves as a support for the lever 19 and under it is a spring 21 pressing the member 6 downwardly towards the inclined faces 22 of the case. This inclined part encircles the claws 15 the ends 24 of which embrace the tapered or conelike part 25 of the member 26 through which the fluid is to pass into a pipe, vessel, bearing or other recipient.

In order to place the coupling on the member 26 it suffices to bear upon the lever 19 to raise the member 6 which causes the claws 15 to be separated under the action of the spring 16, the interior of the cap 20 forming a guide.

Once the member 26 has been adjusted the lever 19 is released, the member 6, pushed by the spring 18, returns downwardly the claws 15 engage with the truncated cone 25 under the action of the truncated cone 22 of the cap 20, and the part 27 of the truncated cone 25 raises the valve 9 whose orifices 10 are uncovered and form communication between the inlet 4 and the member 26.

If the pressure in the apparatus increases, the chamber 13 forms a differential piston chamber whilst pushing the member 6 upwardly, compressing the spring 21 and increases the tightening action of the truncated parts 22, 23, 24, 25.

Figure 3:
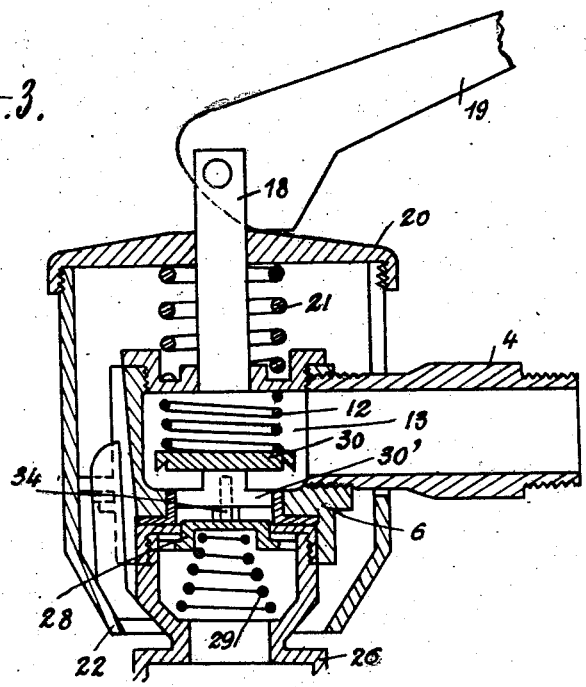
Figs. 3 and 4 are sectional views and show modified forms.

In the form of construction shown in Fig. 3, the piston valve 9 is replaced by a flat plate 30 which is opened in the manner as in Figs. 1 and 2 by the action of the upper part of the member 26, which, when bearing on the guide blades 30' of the plate 30 lift and ensure communication between the inlet pipe 4 and the member 26. The opening of the member 26 is closed in any suitable manner by a ball, flap, valve, etc. 28, which is opened by the action of the pressure of the liquid. An opposing spring 29 hold the last mentioned closing device against its seat. The plate 30 may be provided with a lower adjustable projection 34 which, during attachment acts on the valve 28 for opening it at the same time as the plate 30 to enable the member 26 to be emptied by suction.

Figure 4:
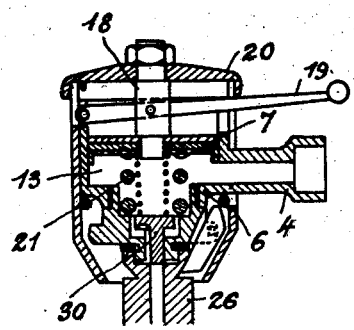

In the form of construction shown in Fig. 4 the lever 19 is arranged in the interior and is of the second order.

Moreover the plug 7 of the member 6 is movable in the said member and forms a piston. The spring 21 is then arranged between the piston 7 and the bottom of the chamber 13. When the pressure increases the piston moves upward and by means of its rod 18 moves the cap 20, to which it is secured, thus increasing the action of the truncated surfaces amongst themselves.

It will be understood that the conicity of the internal and external surfaces of the claws may be the same or not and this conicity may also vary.

The joint is indetachable except in the manner described by reason of its external casing which bears on the attaching claws the more the greater the pulling force exerted.

I claim:

A detachable coupling for pipes and the like comprising relatively longitudinally movable inner and outer members, the latter having a conical part, a ported valve in the inner member, a spring acting against the inner end of said valve, the inner member being in communication with a fluid conduit and provided with exterior locking lugs or claws and means whereby the same are adapted to be operated by said conical part of the outer member to lock the coupling to a conical part of the member to which it is to be connected, and means whereby the operation of coupling will open the valve in the inner member.

In testimony whereof I hereunto affix my signature.

JACQUES MULLER.